3,075,995
TETRAHYDRO-1,1-DIOXO-3-THIENYL CARBANILATES

William J. Pyne, Painesville, Ohio, assignor to Diamond Alkali Company, Cleveland, Ohio, a corporation of Delaware
No Drawing. Filed Dec. 2, 1959, Ser. No. 856,678
3 Claims. (Cl. 260—332.1)

This invention relates to novel tetrahydro-1,1-dioxo-3-thienyl carbanilates and the chloro and nitro derivatives thereof, their preparation and utilization.

The compounds of this invention have the formula:

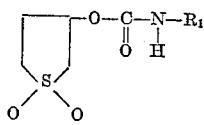

wherein $R_1$ is a radical selected from the group consisting of phenyl, chlorophenyl, dichlorophenyl, trichlorophenyl, tetrachlorophenyl, pentachlorophenyl, nitrophenyl, tolyl, xylyl and naphthyl.

The preferred chlorophenyl substituted tetrahydro-1,1-dioxo-3-thienyl carbanilates can be prepared by reacting tetrahydro-1,1-dioxo-3-thienyl chloroformate with a chloro substituted aniline. Similarly, the nitrophenyl derivatives can be prepared by reacting tetrahydro-1,1-dioxo-3-thienyl chloroformate with a nitroaniline. In a like manner, tetrahydro-1,1-dioxo-3-thienyl N-(2-naphthyl) carbamate can be prepared by reacting tetrahydro-1,1-dioxo-3-thienyl chloroformate with beta naphthylamine.

It has been found that those compounds of this invention, having the formula

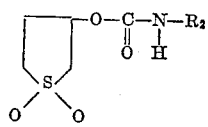

wherein $R_2$ is a radical selected from the group consisting of chlorophenyl, trichlorophenyl, tetrachlorophenyl, pentachlorophenyl and nitrophenyl, exhibit a high degree of biological activity and are especially useful as active ingredients in various applications where biological activity is required, e.g., in the field of parasiticides, e.g., nematocides.

In using the tetrahydro-1,1-dioxo-3-thienyl carbanilates of this invention as biologically active compositions, they can be applied as such or they can be extended with a liquid or solid diluent. The compounds of this invention can, for example, be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art of the pest control adjuvant.

Biologically active compositions embodying the invention can be prepared in the form of solids or liquids. Solid compositions, preferably in the form of wettable powders, are compounded to give homogeneous free-flowing powder by mixing the active ingredient with finely-divided solids, Attaclays, diatomaceous earth, synthetic fine silica or flours, such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The biologically active compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including, for example, the material known as Triton X–155 (100% alkylaryl polyether alcohol—U.S. Patent No. 2,504,064).

Generally, the surface-active agent will not comprise more than about 5% to 15% by weight of the composition depending, of course, upon the particular surface-active agent, the system in which it is placed, and the result desired; in certain compositions, the percentage will be 1% or less. Usually, the minimum lower concentrations will be 0.1%.

The active compound is, of course, applied in amount sufficient to exert the desired biological activity. For example, the amount of the active ingredient present in the compositions as actually applied for killing nematodes will vary with the manner of application, the particular nematodes for which control is sought, the purposes for which the application is being made, and like variables. In general, however, the biologically active compositions will contain from about 0.5% to 85% by weigth of the active ingredient.

Fertilizer materials, herbicidal agents, and other pest control agents such as insecticides and fungicides can be included in the biologically active compositions of the invention if desired.

In order that those skilled in the art may more completely understand the present invention and the preferred methods by which the same may be carried into effect, the following specific examples are offered:

EXAMPLE 1

*Preparation of Tetrahydro-1,1-Dioxo-3-Thienyl Chloroformate*

94 g. of 3-hydroxytetrahydrothiophene-1,1-dioxide prepared according to method in U.S. Patent 2,449,173, is dissolved in 300 ml. of dioxane and saturated with excess gaseous phosgene at the reflux temperature of the solvent. The dioxane is then removed and the crude dark-colored residue recrystallized twice from hot ethyl acetate solution. The crystallized product (obtained in 46% yield)

melts at 86° C. and is identified as tetrahydro-1,1-dioxo-3-thienyl chloroformate ($C_5H_7ClSO_4$) from its elemental analysis:

| Element | Calculated, Percent by Weight | Actual, Percent by Weight |
| --- | --- | --- |
| C | 30.20 | 30.48 and 30.71 |
| H | 3.51 | 3.42 and 3.41 |

EXAMPLE 2

*Preparation of Tetrahydro-1,1-Dioxo-3-Thienyl p-Chlorocarbanilate*

A solution of 20 g. (0.157 mol) of p-chloroanaline in 100 ml. of benzene is added dropwise to a hot solution of 30 g. (0.151 mol) of tetrahydro-1,1-dioxo-3-thienyl chloroformate and 15 g. of pyridine in 300 ml. of benzene. The reaction mixture is maintained at reflux temperature for about 2½ hours. The mixture is cooled to room temperature and then washed with cold water and the water layer discarded. The crude benzene soluble product weighs 26.4 g. The product is recrystallized from hot water and yields 22.7 g. of gleaming white needles melting at 137° C. Elemental analysis identifies the product as tetrahydro-1,1-dioxo-3-thienyl p-chlorocarbanilate, $C_{11}H_{12}SNClO_4$.

| Element | Calculated, Percent by Weight | Actual, Percent by Weight |
| --- | --- | --- |
| C | 45.6 | 45.6 |
| H | 4.2 | 4.1 |

EXAMPLE 3

*Preparation of Tetrahydro-1,1Dioxo-3-Thienyl m-Chlorocarbanilate*

Employing the process and quantities of Example 2, m-chloroaniline is reacted with tetrahydro-1,1-dioxo-3-thienyl chloroformate. The crude product is recrystallized from xylene, yielding 21.6 g. of white solid melting at 110° to 111° C. Sodium fusion tests confirm the presence of sulfur, nitrogen and halogen. Elemental analysis identifies the product as tetrahydro-1,1-dioxo-3-thienyl m-chlorocarbanilate, $C_{11}H_{12}SNClO_4$.

| Element | Calculated, percent by Weight | Actual, percent by Weight |
| --- | --- | --- |
| C | 45.59 | 46.17 |
| H | 4.18 | 4.17 |

EXAMPLE 4

*Preparation of Tetrahydro-1,1-Dioxo-3-Thienyl 2,4,6-Trichlorocarbanilate*

30 g. (0.15 mol) of tetrahydro-1,1-dioxo-3-thienyl chloroformate in 400 ml. of benzene and 15 g. of pyridine are heated to reflux temperature. A solution of 33.4 g. of 2,4,6-trichloroaniline in 150 ml. of benzene is added dropwise to the refluxing solution. The reaction mixture is refluxed for about 2½ hours and then cooled to room temperature. The mixture is washed several times with water, the organic layer dried over $MgSO_4$ and concentrated by boiling. Upon cooling, 35.4 g. of crude product are obtained. The crude material is recrystallized from a 50% ethyl alcohol-water mixture, yielding 24.2 g. of very fine long needles melting at 78° C. Elemental analysis identifies the product as tetrahydro-1,1-dioxo-3-thienyl 2,4,6-trichlorocarbanilate, $C_{11}H_{10}SNCl_3O_4$.

| Element | Calculated, Percent by Weight | Actual, Percent by Weight |
| --- | --- | --- |
| C | 36.8 | 37.1 |
| H | 2.8 | 2.1 |

EXAMPLE 5

*Preparation of Tetrahydro-1,1-Dioxo-3-Thienyl p-Nitrocarbanilate*

22.1 g. (0.16 mol) of p-nitroaniline in 150 ml. of benzene are added to 31.8 g. (0.16 mol) of tetrahydro-1,1-dioxo-3-thienyl chloroformate in 400 ml. of benzene. The mixture is refluxed for about 6 hours. On cooling, 26.5 g. of a bright yellow solid is obtained. The crude material is recrystallized from a 50% ethyl alcohol-water mixture, yielding 20.6 g. of yellow crystals melting at 207° C. Elemental analysis confirms the product to be tetrahydro-1,1-dioxo-3-thienyl p-nitrocarbanilate, $$C_{11}H_{12}SN_2O_6$$

| Element | Calculated, Percent by Weight | Actual, Percent by Weight |
| --- | --- | --- |
| C | 44.0 | 44.3 |
| N | 4.0 | 4.1 |

EXAMPLE 6

*Preparation of Tetrahydro-1,1-Dioxo-3-Thienyl Carbanilate*

A solution of 18.6 g. (0.20 mol) of aniline in 100 ml. of benzene is added dropwise to a solution of 39.8 g. (0.20 mol) of tetrahydro-1,1-dioxo-3-thienyl chloroformate and 20 g. of pyridine in 400 ml. of benzene which has been heated to reflux temperature. The reaction mixture is refluxed for about 2 hours. After cooling to room temperature, cold water is added to the mixture, causing a solid to precipitate. The cold benzene-solid water mixture is filtered, yielding 32 g. of crude white solid. The crude product is recrystallized from toluene, yielding 26 g. of white crystals melting at 172° to 173° C. Elemental analysis confirms the product to be tetrahydro-1,1-dioxo-3-thienyl carbanilate, $C_{11}H_{13}SNO_4$.

| Element | Calculated, Percent by Weight | Actual, Percent by Weight |
| --- | --- | --- |
| C | 51.8 | 52.2 |
| H | 5.1 | 5.3 |

EXAMPLE 7

*Preparation of Tetrahydro-1,1-Dioxo-3-Thienyl 3,4-Dichlorocarbanilate*

PART A

A solution of 31.7 g. (0.16 mol) of tetrahydro-1,1-dioxo-3-thienyl chloroformate and 16 g. of pyridine in 300 ml. of benzene is heated to reflux temperature. A solution of 26 g. (0.16 mol) of 3,4-dichloroaniline in 100 ml. of benzene is added dropwise to the reflux solution. The mixture is refluxed for about 2½ hours and then worked up in a manner similar to that in the preceding examples. The crude product obtained (30.2 g.) is recrystallized from 95% ethanol, yielding 24 g. of a fine white powder melting at 158° C. Elemental analysis confirms the product to be tetrahydro-1,1-dioxo-3-thienyl 3,4-dichlorocarbanilate, $C_{11}H_{11}SNCl_2O_4$.

| Element | Calculated, Percent by Weight | Actual Percent by Weight |
| --- | --- | --- |
| C | 40.6 | 40.5 |
| H | 3.4 | 3.8 |

PART B

Fungicidal utility is demonstrated by the ability of the product of Part A to protect tomato plants against the late blight fungus, *Phytophthora infestans*. The method employs tomato plants 5 to 7 inches high of the variety Bonny Best. 100 ml. of the test formulation (400 p.p.m. tetrahydro-1,1-dioxo-3-thienyl, 3,4-dichlorocarbanilate—5% acetone—0.01% Triton X-115—balance water) are sprayed on the plants at 40 lbs. air pressure while the plants are being rotated on a turntable in a spray chamber. After the spray deposit is dry, the treated plants and comparable untreated controls are again sprayed as described above with a sporangial suspension containing approximately 150,000 sporangia of *P. infestans* per ml. for 30 seconds at 20 lbs. The plants are held in a 100% humid atmosphere for 24 hours at 60° F. to permit spore germination and infection. After 2 to 4 days, lesion counts are made on the three uppermost fully expanded leaves. Comparing the number of lesions on the test plants and control plants shows 63% disease control on test plants.

EXAMPLE 8

*Preparation of Tetrahydro-1,1-Dioxo-3-Thienyl N(2-Naphthyl) Carbamate*

PART A

A reaction vessel is charged with 23 g. (0.16 mol) of beta naphthyl amine, 31.8 g. (0.16 mol) of tetrahydro-1,1-dioxo-3-thienyl chloroformate, 16 g. of pyridine and 600 ml. of benzene. The mixture is refluxed for about 6 hours and cooled to room temperature. 20.2 g. of crude solid product are separated from the reaction mixture by filtration. The crude product is recrystallized from xylene, yielding 17.2 g. of a white powder melting at 153° to 154° C. Elemental analysis indicates the product to be tetrahydro-1,1-dioxo-3-thienyl N-(2-naphthyl)carbamate, $C_{15}H_{15}SNO_4$.

| Element | Calculated, Percent by Weight | Actual, Percent by Weight |
|---|---|---|
| C | 59.0 | 57.7 and 58.0 |
| H | 5.0 | 5.0 and 4.8 |

PART B

A tomato foilage disease test is conducted measuring the ability of the product of Part A to protect tomato foliage against infection by the early blight fungus *Alternaria solani*. Tomato plants 5 to 7 inches high of the variety Bonny Best are employed. The plants are sprayed with 100 ml. of test formulation (2000 p.p.m. tetrahydro - 1,1 - dioxo - 3 -thienyl N - (2 - naphthyl) carbamate—5% acetone—0.01% Triton X-155—balance water) at 40 lbs. air pressure while being rotated on a turntable in a spray chamber. After the spray deposit is dry, the treated plants and comparable untreated controls are again sprayed as described above with a sporangial suspension containing approximately 20,000 conidia of *A. solani* per ml. for 30 seconds at 20 lbs. The plants are held in a 100% humid atmosphere for 24 hours at 70° F. to permit spore germination and infection. One day after removal from the humid atmosphere, lesion counts are made on the three uppermost fully expanded leaves. Data based on the number of lesions obtained on the control plants shows 59% disease control.

PART C

To evaluate bactericidal activity, the test chemical is mixed at a concentration of 250 p.p.m. with distilled water containing 5% acetone and 0.01% Triton X-155. 5 ml. of the test formulation is put in each of two test tubes and to each test tube is added ½ ml. of bacterial suspension of one of the two test species, *Erwinia amylovora* and *Escherichia coli*, prepared from 24-hour cultures grown on nutrient agar slants. The tubes are then incubated for 4 hours at 30° C. Transfers are then made to sterile broth with a standard 4 mm. loop and the thus-inoculated broth is incubated for 48 hours at 30° and 37° C., respectively, when growth is rated as follows: A=no growth, B=slight, C=moderate and D= heavy growth. Using this procedure, the product of Part A of this example receives a rating of B against *E. amylovora* and C against *E. coli*.

EXAMPLE 9

In showing the nemotocidal activity of the compounds of this invention, composted greenhouse soil in one-half gallon glazed crocks is infested with 3 to 5 g. of knotted or galled tomato roots containing root knot nematodes, *Meloidogyne* species. Treatment at various rates equivalent to 512, 256 and 128 lbs./acre in a series of tests (770, 285, 192 mg./crock, respectively) is effected by mixing the test chemical intimately with the soil. An indicator crop of three tomatoes are transplanted into treated crocks and into infested and non-infested check crocks 4 to 7 days after treatment. The degree of infection which is measured by the number and size of galls formed compared to checks is used as an index of nematocidal activity of the test material. Test results indicating the percent control of the root knot nematode by several compounds of this invention are shown in the following table.

| Experiment No. | Compound | Structure | Preparation | Percent root knot control at lb./acre | | | | | |
|---|---|---|---|---|---|---|---|---|---|
| | | | | 512 | 256 | 128 | 64 | 32 | 16 |
| 1 | Tetrahydro-1,1-dioxo-3-thienyl p-chlorocarbanilate. | (structure) | Example 2 | 100 | 95 | | | | |
| 2 | Tetrahydro-1,1-dioxo-3-thienyl m-chlorocarbanilate. | (structure) | Example 3 | 70 | 33 | | | | |
| 3 | Tetrahydro-1,1-dioxo-3-thienyl 2,4,6-trichlorocarbanilate. | (structure) | Example 4 | 100 | 100 | 100 | | | |

| Experiment No. | Compound | Structure | Preparation | Percent root knot control at lb./acre | | | | | |
|---|---|---|---|---|---|---|---|---|---|
| | | | | 512 | 256 | 128 | 64 | 32 | 16 |
| 4 | Tetrahydro-1,1-dioxo-3-thienyl p-nitrocarbanilate. | ![structure] | Example 5 | 70 | 35 | | | | |
| 5 | Tetrahydro-1,1-dioxo-3-thienyl carbanilate. | ![structure] | Example 6 | 10 | 0 | | | | |
| 6 | Tetrahydro-1,1-dioxo-3-thienyl 3,4-dichlorocarbanilate. | ![structure] | Example 7 | 10 | 0 | | | | |
| 7 | Tetrahydro-1,1-dioxo-3-thienyl N-(2-naphthyl) carbamate. | ![structure] | Example 8 | | 0 | | | | |

It is to be understood that although the invention has been described with specific reference to particular embodiments thereof, it is not to be so limited since changes and alterations therein may be made which are within the full intended scope of this invention as defined by the appended claims.

What is claimed is:
1. A compound having the formula

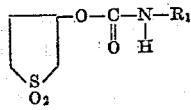

wherein $R_1$ is a radical selected from the group consisting of phenyl, chlorophenyl, dichlorophenyl, trichlorophenyl, tetrachlorophenyl, pentachlorophenyl, nitrophenyl, tolyl, xylyl and naphthyl.

2. The compound tetrahydro-1,1-dioxo-3-thienyl p-chlorocarbanilate.
3. The compound tetrahydro-1,1-dioxo-3-thienyl m-chlorocarbanilate.
4. The compound tetrahydro-1,1-dioxo-3-thienyl 2,4,6-trichlorocarbanilate.
5. The compound tetrahydro-1,1-dioxo-3-thienyl p-nitrocarbanilate.
6. The compound tetrahydro-1,1-dioxo-3-thienyl carbanilate.
7. The compound tetrahydro-1,1-dioxo-3-thienyl 3,4-dichlorocarbanilate.
8. The compound tetrahydro-1,1-dioxo-3-thienyl N-(2-naphthyl) carbamate.

References Cited in the file of this patent
UNITED STATES PATENTS

| | | |
|---|---|---|
| 2,460,233 | Morris et al. | Jan. 25, 1949 |
| 2,656,362 | Faith | Oct. 20, 1953 |
| 2,695,225 | Witman | Nov. 23, 1954 |
| 2,758,955 | Johnson et al. | Aug. 14, 1956 |
| 2,810,728 | Beesley et al. | Oct. 22, 1957 |
| 2,928,766 | Rosen | Mar. 15, 1960 |

OTHER REFERENCES

Sidgwick: Organic Chemistry of Nitrogen, pages 137–138 (1937).